E. W. BARKER.
WATER CIRCULATING SYSTEM FOR EXPLOSIVE ENGINES.
APPLICATION FILED SEPT. 19, 1914.
1,184,407.
Patented May 23, 1916.
2 SHEETS—SHEET 1.
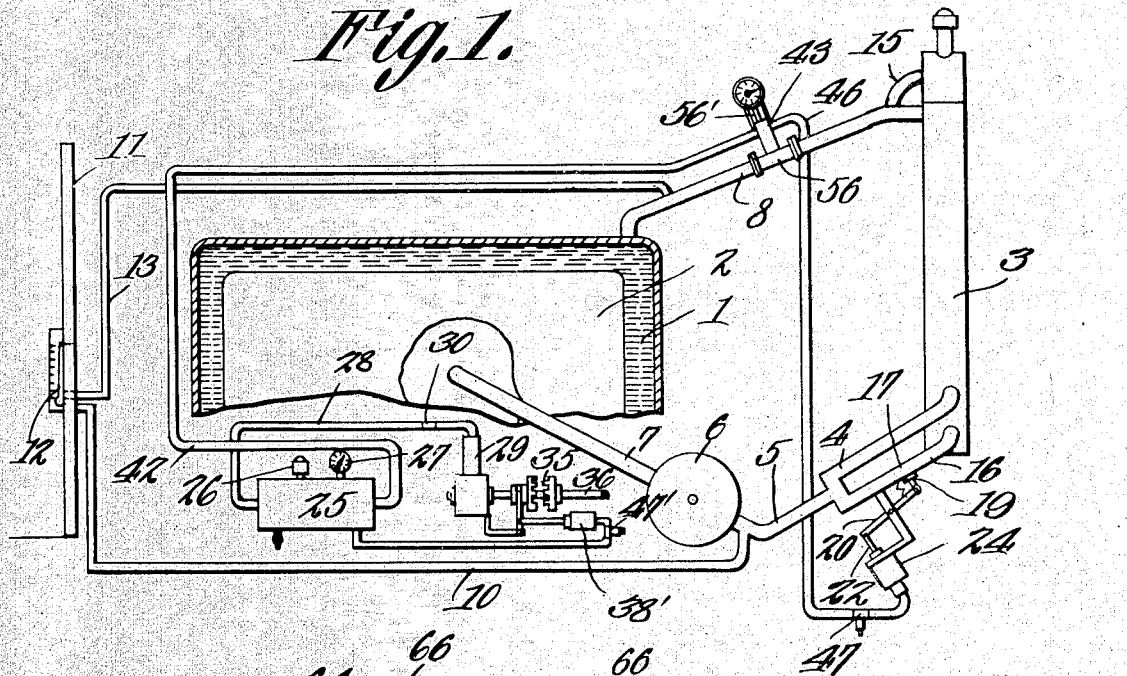
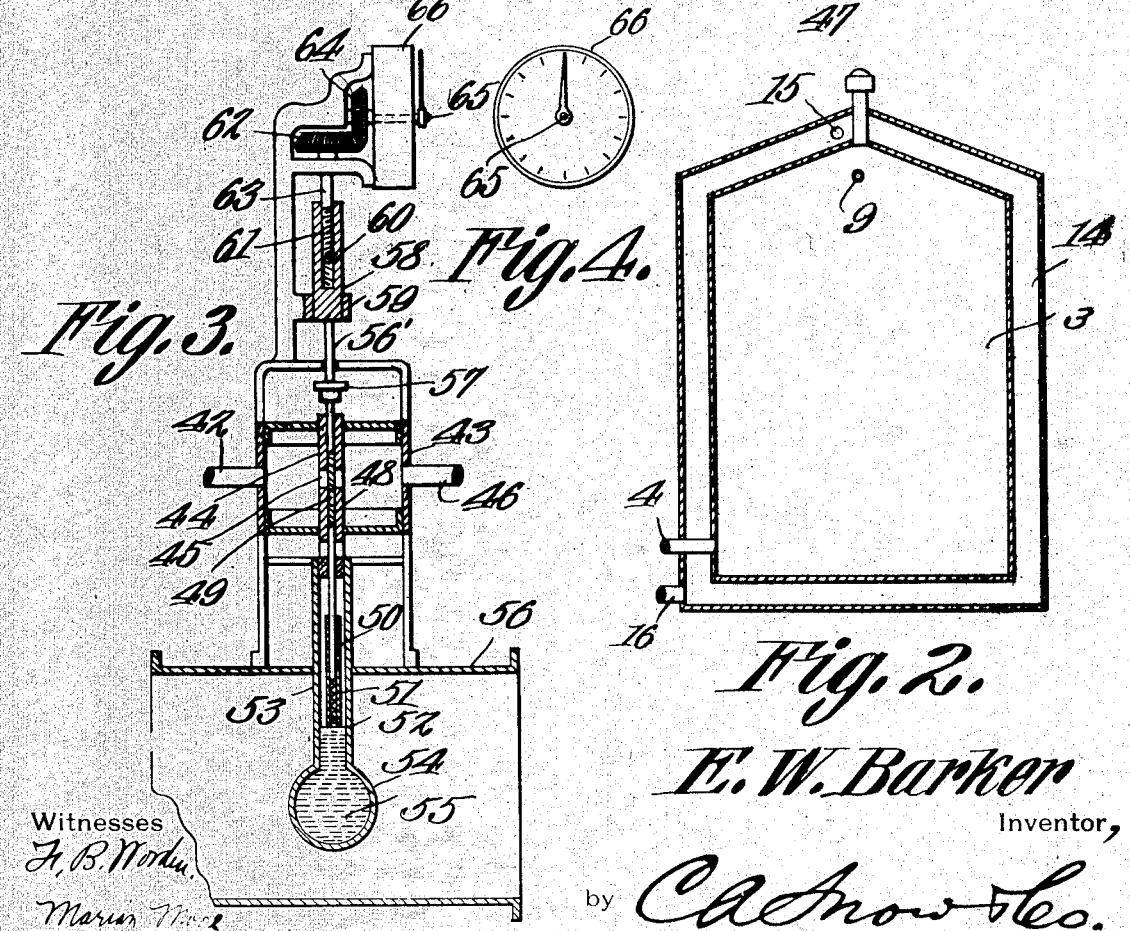
E. W. Barker
Inventor,
by C. A. Snow & Co.
Attorneys.

UNITED STATES PATENT OFFICE.

EVERETT W. BARKER, OF CHARLOTTE, NORTH CAROLINA, ASSIGNOR OF ONE-HALF TO GEORGE H. MARVIN, OF GASTONIA, NORTH CAROLINA.

WATER-CIRCULATING SYSTEM FOR EXPLOSIVE-ENGINES.

1,184,407.  Specification of Letters Patent.  Patented May 23, 1916.

Application filed September 19, 1914.  Serial No. 862,514.

*To all whom it may concern:*

Be it known that I, EVERETT W. BARKER, a citizen of the United States, residing at Charlotte, in the county of Mecklenburg and State of North Carolina, have invented a new and useful Water-Circulating System for Explosive-Engines, of which the following is a specification.

The present invention relates to improvements in water circulation systems for explosion engines, and more particularly to automobile engines, one object of the invention being the provision of means whereby the ordinary water circulating system may be supplemented thermostatically and automatically, so that in the event of the engine being loaded to or near its full capacity, the temperature of the water heated from the cylinder of the engine will cause the actuation of an automatic device to connect to the circulating system a supplemental water supply, the same being automatically disconnected as soon as the water has attained a temperature low enough to permit of the cut off of the supplemental supply.

A further object of the present invention, is the provision of a radiator provided with a main and a supplemental water supplying chamber, alined with automatic means whereby the two are connected or disconnected due to the temperature of the water circulating from the water jacket of the engine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 5:
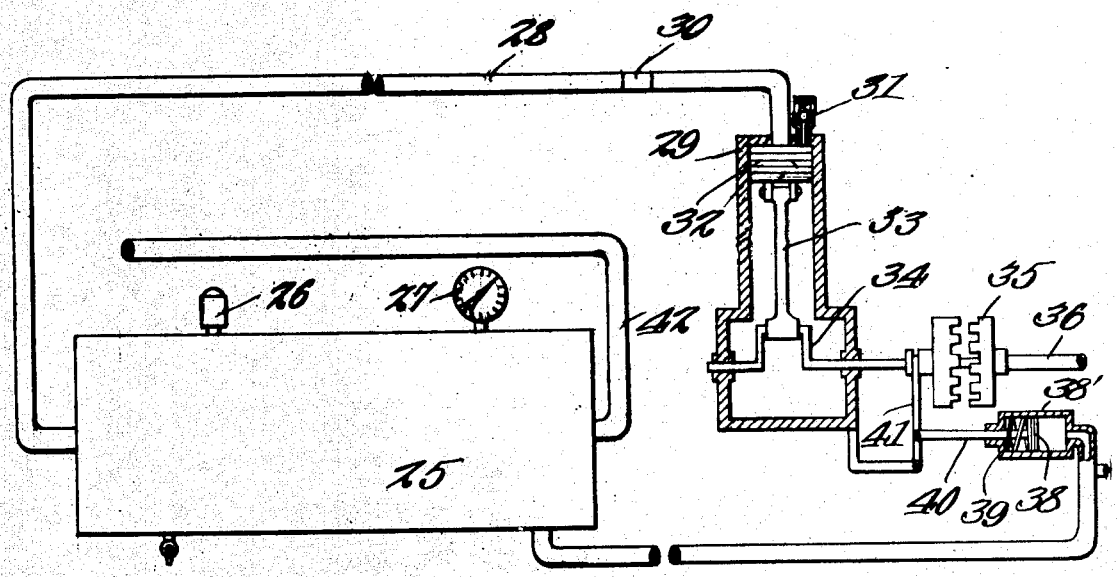
Figure 6:
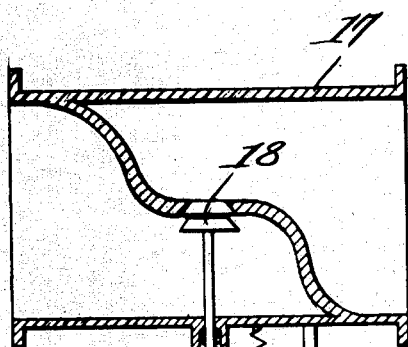
Figure 7:
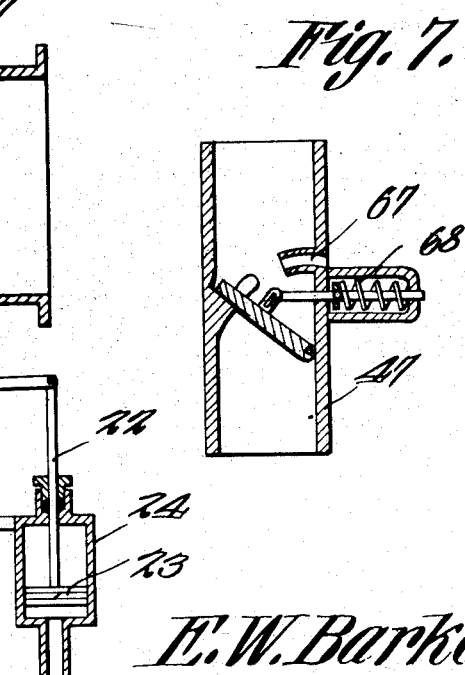

In the drawings:—Figure 1 is a diagrammatic view showing the complete system operably connected to the explosion engine of an automobile. Fig. 2 is a transverse cross section through the radiator. Fig. 3 is an enlarged detail view of the thermostatic control for causing the automatic operation of the present system. Fig. 4 is a detail view of the setting dial therefor. Fig. 5 is a diagrammatic view partly in section showing the air tank and the air pump, and the means for automatically connecting and disconnecting the pump according to the pressure within the tank. Fig. 6 is a detail view of the pneumatically actuated valve for connecting the supplemental tank to the present system. Fig. 7 is a detail sectional view of a bleeding check valve used in connection with the present system.

Referring to the drawings, the numeral 1 designates the water jacket of the explosion engine 2, while 3 indicates the main water supply at the radiator.

Leading from the main radiator at the lower end thereof is a circulating pipe 4 which branches to connect the pipe 5 with the rotary pump casing 6 whose outlet 7 is connected to the water jacket 1, while leading from the upper end of the water jacket 1, is a circulating pipe 8 which has its outlet at 9 in the upper end of the main tank 3.

The main tank 3 is here shown merely indicative of any form of radiator, the same either being a solid water tank or a coil as may be found desirable.

In order that the operator of the present system, whether it is an automobile or other means, may ascertain the temperature of the water which is being circulated, there is led from the pipe 5, a pipe 10, connected to the support or dash board 11, to the thermometer 12, a pipe 13 being led therefrom to the pipe 8, as clearly illustrated in diagram in Fig. 1.

Surrounding the tank 3 is a supplemental reservoir 14, which is also in communication at 15 with the return circulating pipe 8 so that the proper circulation may be had within the supplemental tank 14, whose outlet pipe 16 is connected to the pipe 5 so that the water from the tank 14 may be properly supplied through the rotary pump casing 6 to the pipe 7 and water jacket 1, the return being through the pipe 8 and branch 15.

In order to provide an automatic means for connecting the supplemental water supply of the tank 14 to the present circulating system, a valve casing 17 is connected in the pipe 16 and is controlled by the valve 18 carried by the stem 19 operably connected to the walking beam 20, a spring 21 being employed to normally hold the valve 18 closed. Operably connected to the opposite end of the walking beam 20 is a piston rod 22, which is connected to the piston 23 mounted in the air controlled cylinder 24. Thus under normal conditions, the spring 20 holds the valve 18 closed so that the water from the supplemental tank 14 will not enter into the pipe 5 and consequently assist in the circulation through the water jacket 1.

In order to supply air to the present system, for automatically operating the piston 23, a reservoir 25 is provided, the same having attached thereto, the safety valve 26 and a gage 27, the pipe 28 being connected thereto so that air may be supplied from the pump cylinder 29 and said pipe 28 being provided with a check valve 30 while the pump cylinder is provided with the valve controlled inlet 31. Provided in the cylinder 29 is a piston 32, which is operated through the piston rod 33 and the crank 34, upon which is mounted the clutch 35.

The shaft 34 through the clutch 35 may be operated directly from the shaft of the engine or if desired from the shaft of the rotary pump 6. In this instance, therefore one of the clutch members connected to the shaft 36 is rotating at all times, and the clutch 35 is only operated to connect the shaft 36 to the crank shaft 34 when the air within the tank 25 has been reduced to a predetermined pressure. At which time, the spring 39 will operate the piston 38 and cause the stem 40 to operate the walking beam 41 and consequently throw the clutch. By this means, the pump is automatically operated to supply air through the tank 25.

Leading from the tank 25 is a pipe 42 which extends upwardly and is connected to the valve casing 43. The casing 43 is divided by the partition 44 having the port 45 therethrough. Leading from the opposite side of the casing 43 is a pipe 46, which is in communication through the check valve 47 with the pneumatic cylinder 24.

Mounted for sliding movement in the partition 44 so as to control the port 45 thereof, and thus the communication with opposite sides of the valve casing 43, is a valve stem 48 provided with the port 49. This valve stem 48 is mounted for sliding movement in the tubular stem 50 in which is mounted the spring 51, and said tubular stem 50 is provided with the plunger 52 mounted in the tube 53 of the thermostatic device 54. This device 54 is a mercury tube and contains the mercury 55. Thus as the heat of the water within the casing 56, which is disposed in the pipe 8, causes the expansion of the mercury 55, the plunger 52 will be moved upwardly and through the spring 51 transmits motion to the valve stem 48 so as to place the port 49 in registration with the port 45 and thus permit the air to flow from the conduit 42 through the conduit 46 to operate the piston 23 and consequently open the valve 18.

In order to provide a means for adjusting the tension of the spring 51 and consequently the temperature at which the port 49 will be placed in registration with the port 45, a vertically movable stem or rod 56' is disposed coaxial with the stud 57 of the stem 48, and is itself carried by the block 58 which is mounted in the sleeve 59 for sliding movement only. This block 58 is provided with the interiorly screw threads 60 which coöperate with the screw 61 to thus cause the stem 56' to depress or release the spring 51 and consequently regulate the temperature at which the port 49 is caused to register with the port 45.

A beveled gear 62 is carried by the threaded stem 63 which coöperates with the threaded socket 60, while the beveled gear 64 is operated by the pointer arbor 65 of the indicator 66. Thus the operator can readily adjust the valve stem 48 through the pointer arbor 65 so that the valve 48 will operate at a predetermined temperature and thus automatically permit air to flow from the tank 25 to operate the piston 23 and thus open the valve 18 to permit a supplemental water supply to combine with the main water supply.

The check valve 47 is constructed as illustrated in Fig. 7, and is provided with the venting opening 67 so that as soon as the proper amount of air has been supplied within the tank 25 and the piston 38 has been operated pneumatically to throw out the clutch 35, the same will be operated by a spring 68 to the position as shown in Fig. 6, so that when the pressure has reduced sufficiently within the tank 25 to permit of the spring 39 to act, the piston 38 will be moved to the right as viewed in Fig. 4 to throw in the clutch 35 and thus connect the crank shaft 34 with the rotating shaft 36.

From the foregoing description, it is evident that the check valves 47 and 47' will operate to permit of the proper actuation of the pneumatic devices 38' and 24, and that therefore at the proper time, the clutch 35 will be operated while the piston 23 will be operated entirely due to the temperature within the circulating pipe 8 as the same passes through the casing 56.

It will thus be seen that the connection and disconnection of the supplemental supply of water in the tank 14 to augment that in the main tank 3, or isolate it therefrom, is entirely automatic, it being controlled by the mercury tube 54 and the valve 48 controlled thereby.

What is claimed is:

1. In a water circulating system, a water jacket, main and secondary radiators, a pipe connecting the main and secondary radiators with the jacket, a second pipe connecting the main radiator and jacket and having a branch connected to the secondary radiator, a pneumatically operated valve for controlling the passage of fluid through the branch, means for operating said valve, and a thermostat controlling said operating means.

2. In a water circulating system, a water jacket, main and secondary radiators, a pipe connecting the main and secondary radiators with the jacket, a second pipe connecting the main radiator and jacket and having a branch connected to the secondary radiator, a pneumatically operated valve for controlling the passage of fluid through the branch, means for operating said valve, and a thermostat associated with the first mentioned pipe and controlling said operating means.

3. In a water circulating system, a water jacket, main and secondary radiators, a pipe connecting the main and secondary radiators with the jacket, a second pipe connecting the main radiator and jacket and having a branch connected to the secondary radiator, a pneumatically operated valve for controlling the passage of fluid through the branch, a pipe connected to said valve and having a valve controlling the passage therethrough, and a thermostat controlling the second mentioned valve.

4. In a water circulating system, a water jacket, main and secondary radiators, a pipe connecting the main and secondary radiators with the jacket, a second pipe connecting the main radiator and jacket and having a branch connected to the secondary radiator, a pneumatically operated valve for controlling the passage of fluid through the branch, a pipe connected to said valve and having a valve controlling the passage therethrough, and a thermostat controlling the second mentioned valve, the thermostat being associated with the first mentioned pipe.

5. In a water circulating system, a water jacket, main and secondary radiators, a pipe connecting the main and secondary radiators with the jacket, a second pipe connecting the main radiator and jacket and having a branch connected to the secondary radiator, a valve assembled with said branch for controlling the flow of water through said branch only, and a thermostat controlling said valve.

6. In a water circulating system, a water jacket, main and secondary radiators, a pipe connecting the main and secondary radiators with the jacket, a second pipe connecting the main radiator and jacket and having a branch connected to the secondary radiator, a valve for controlling the passage of fluid through said branch, actuating means for operating said valve, and a thermostat coöperating with said actuating means for normally preventing the same from operating said valve, whereby when the thermostat is operated a predetermined amount, said actuating means is brought into action for operating the valve.

In testimony that I claim the foregoing as my own, I have hereto affixed my signature in the presence of two witnesses.

E. W. BARKER.

Witnesses:
JOHN M. JAMES,
F. L. PLAISANCE.